Patented May 30, 1950

2,509,786

UNITED STATES PATENT OFFICE 2,509,786

CORROSION PREVENTIVE COMPOSITIONS

Knapel F. Schiermeier and Herbert A. Poitz, Alton, Ill., assignors to Shell Development Company, San Francisco, Calif., a corporation of Delaware No Drawing. Application April 26, 1948, Serial No. 23,397

10 Claims. (Cl. 106—14)

This invention relates to compositions suitable for inhibiting or even preventing the rusting and corroding of metal surfaces. More particularly, the present invention pertains to novel compositions of matter which on application to metal surfaces form protective films which are impervious to moisture, corrosive fluids and the like, thereby protecting said metal surface for relatively long periods of time.

It is well known that moisture, corrosive fluids, gases, and the like readily attack ferrous and non-ferrous metals causing corrosion, rusting, pitting and other damage to such surfaces. Also aqueous solutions in contact with metallic surfaces readily attack it and cause corrosion and rusting. Under certain conditions, the problem of corrosion is exceedingly serious because once started it becomes progressively accelerated. Thus, oils containing small amounts of water cause corrosion of metals in contact therewith. This is due to the fact that oils and particularly liquid petroleum hydrocarbons are very good solubilizers of oxygen, and any moisture present therein becomes surrounded by an almost inexhaustible store of oxygen. Moisture under such conditions is inhibited from evaporating and since the rate of transfer of oxygen from hydrocarbons, such as mineral oil or gasoline, to water is limited, ideal conditions for rusting and corrosion are set up. The presence of electrolytes, and formation of corrosive decomposition products in oils, and the like, also greatly increase the rate of corrosivity.

Under conditions where, in addition to those enumerated, elevated temperature is encountered, corrosion activity is greatly accelerated. Thus, corrosion is greatly accelerated when moisture, salt spray and other contaminants or acidic composition products or corrosive gases, come in contact with hot metal bodies particularly under conditions normally developed in machinery and industrial equipment during its operation.

Corrosion of metallic surfaces can attain such an aggravated stage as to cause great fatigue stresses to be set up, which ultimately may result in cracking of metal.

The problem is particularly serious when metallic parts, machines, such as aircraft engines, and the like are transported over bodies of salt water over long periods of time under humid and high temperature conditions. Unless the metal surfaces are protected with a coating composition which is impervious to the active corrosive producing agents, serious and damaging corrosion sets in.

Metal articles which have been pickled, quenched and otherwise treated and thereafter stored away must also be protected against corrosion until ready for use.

Countless materials and compositions have been tried for protecting metallic surfaces against corrosion by coating said surfaces with a non-reactive, corrosion preventive composition, which can be easily removed when desired. Thus metal surfaces have been coated or treated with greases, fatty compositions, waxes, organic compounds, e. g. organic acids, amines, inorganic compounds and the like in order to protect them against corrosion. In almost all cases where no chemical reaction occurred between the surface treated and the corrosion or rust inhibitor very little benefit was derived. This is due to the fact that non-chemical reactive inhibitors are incapable of penetrating the surface being protected and are incapable of displacing the contaminant therefrom. In cases where such inhibitors are capable of forming protective coatings on surfaces they are easily displaced by moisture or rupture readily.

Although chemically reactive protective materials are more durable a serious drawback to them is that they change the surface characteristic of the metal which under certain conditions is most undesirable. A coating composition which is non-reactive with contacting surfaces, but which resists penetration by corrosive materials and adheres tenaciously to a surface for intervals desired is generally preferable. This is due to the fact that on removal of the protective coating the metal is substantially in the same state as when originally preserved so that thereafter it may be treated in any desired manner.

It is an object of this invention to protect metal surfaces in contact with corrosive contaminants by coating said surfaces with a composition which has no detrimental effect upon the metal surface thus coated. It is still another object of this invention to protect metallic surfaces with coating compositions which resist rupture even at elevated temperatures and which can be readily removed when desired. Other objects will be apparent from the following description.

It has now been discovered that various metal surfaces which are conducive to corrosive influences can be protected simply and effectively by coating with a composition of matter comprising a blend containing a substantial amount, sufficient to impart a desired consistency to the composition of a light hydrocarbon boiling below the lubricating oil range and fractions thereof having admixed therewith minor amounts of:

(1) Oxidized waxy hydrocarbon,
(2) A mixture of alkaline earth metal salts of organic sulfonic acids, and
(3) A non-aromatic alcohol.

If desired minute amounts of natural fatty oils and wax fractions and derivatives thereof can be added to the composition of this invention.

The oxidized substantially non-aromatic waxy hydrocarbons may be obtained from hydrocarbons in the manner fully described herein below. Waxy hydrocarbons also may be obtained by polymerization of olefinic materials by the Fischer-Tropsch process or by dehydration of long-chain aliphatic alcohols and oxidizing said materials.

Waxy hydrocarbons may be recovered from suitable petroleum fractions such as Pennsylvania crude, East Texas crudes, Mid-Continent crudes, and the like, by de-asphaltizing the hydrocarbon and thereafter removing the wax from the asphalt-free hydrocarbon fraction by any known suitable means. The asphalt may be separated from the oil either by distillation or solvent extraction and used as a component of composition of this invention. In the solvent process a solvent is selected in which the oil is relatively soluble but in which the asphaltic materials are relatively insoluble. Among such solvents are the light liquid hydrocarbons such as ethane, propane, butane, as well as naphtha and gasoline. Oils treated with such solvents extract the oil and wax leaving behind the asphaltic materials as residue which can be utilized as a component of composition of this invention. The wax-oil mixture may be removed from the asphalt-free solution by chilling the solution, and then separating the precipitated wax by settling, filtering or centrifuging. Waxy materials thus produced are known in the art as slop waxes, petrolatum stock, slack waxes, scale waxes, paraffin waxes, plate, mal-crystalline and needle waxes, micro-crystalline waxes and the like. These waxes are differentiated from each other by the degree of de-oiling to which they are subjected and all of them may be used provided they are substantially free from aromatics.

De-waxing or separation of the above waxy constituents from the oil may be accomplished by selective solvent treatment using as the diluents liquefied normally gaseous hydrocarbons such as propane, butane, and other corresponding olefins and/or their mixtures, as well as oxygen-containing liquid organic substances such as alcohols, ethers, esters, ketones, aldehydes, acids and/or their mixtures. These may include methyl, ethyl, propyl, butyl, amyl alcohols; methyl or methylethyl ether; acetones, diethyl, dimethyl, and methylisobutyl ketones and the like. Chlorinated hydrocarbons such as carbon tetrachloride or trichlorethylene and mixtures of chlorinated hydrocarbons as mentioned above also may be used.

The first step in obtaining waxy constituents from petroleum crudes, for example, such as Mid-Continent crude is to treat said crude with about six volumes of liquid propane so as to remove the asphalt. The propane from the propane-oil solution is vaporized so that the ratio of propane to oil is reduced approximately 2 to 1. The solution is then chilled to about −40° F. and lower causing separation of the wax from the oil. The wax can be removed by filtration and the propane separated from the de-asphalted and dewaxed oil and waxy material by distillation.

Waxy materials can also be recovered from the distillate or residuum lube oil fractions and these wax fractions can be split still further into special wax cuts having desired characteristics by use of selective solvents. This is based on a difference in solubility of different waxy fractions in a given solvent. Thus, when using a methylethyl ketone type solvent the aromatic constituents can be removed by successively cooling the mixture down to between about −40° F. and −76° F. so as to remove the aromatics which become substantially soluble in the solvent as the temperature is lowered while the straight-chain waxes and isoparaffins become substantially insoluble in the solvent. The straight-chain waxes can be separated from the isoparaffins by extraction and fractional crystallization. Depending upon the distillate cut used waxes of from 12 to above 36 carbon atoms and higher can be obtained.

The above type of waxy hydrocarbons may be admixed with synthetic waxes produced by polymerization of olefins under pressure or by dehydrating long-chain fatty alcohols such as octadecyl alcohol and the like. Admixed with non-aromatic waxy hydrocarbon may be minor amounts of waxy materials obtained from non-hydrocarbon services such as marine animal waxes, vegetable waxes and the like, and specifically may be illustrated by spermaceti, Japan wax, carnauba wax, montan wax, sugar cane wax, cotton wax, etc. and the mixture oxidized.

The waxy materials and their mixtures may be oxidized by any suitable means such as blowing with an oxidizing gas such as air, air enriched with oxygen, pure oxygen, oxygen diluted with inert gas and the like. Substantially the waxy material may be oxidized by such means as are disclosed in the following U. S. patents: 1,863,004, 2,043,923, 2,156,226, 2,186,910 and 2,216,222. If desired minor amounts not exceeding about one-third and preferably less, of non-oxidized waxy materials may be admixed with the oxidized products.

The amount of oxidized material used in compositions of this invention may vary from about 5% to about 25% and higher, and the preferred range is from about 10% to about 20% by weight. If non-oxidized waxy materials are used they are generally added in amounts not exceeding about 5% and preferably less of the total amount of the oxidized wax used.

The alkaline earth metal sulfonate mixtures which constitute an important component of compositions of this invention may be derived from sulfonic acids obtained from any suitable source. Thus, sulfonates may be obtained by sulfonating various petroleum hydrocarbon fractions with sulfuric acid, oleum chlorosulfonic acid, sulfur trioxide, and their mixtures. Petroleum hydrocarbons may be treated with sulfur dioxide and a halogen and the resultant product hydrolyzed and neutralized to produce sulfonated hydrocarbons. The petroleum hydrocarbons may be aliphatic, cyclic and/or aromatic and specifically may be gas oil, kerosene, light oil, turbine oil, mineral lubricating oil, heavy oil, petroleum waxes, petrolatum and their mixtures.

For example, a turbine oil having a Saybolt Universal viscosity at 100° F from about 400 to 540 seconds is treated with fuming sulfuric acid, preferably in small increments. After a calculated amount of sulfuric acid has been added to the oil, the sludge which forms is removed, the acid treated oil containing dissolved oil-soluble sulfuric acid is neutralized with a solution of sodium hydroxide. The aqueous alkali solution is removed from the mixture and the sodium salts of petroleum sulfonic acid extracted with alcohol, the alcohol layer containing the sulfonates can be removed by distillation or by any other suitable means.

Modifications to the above procedure can be made by removing acid sludge after the entire required amount of acid has been added. Also the sulfonic acid can be removed before neutralization rather than after as indicated above. If this is done, it is preferable to give the acid treated oil a clay treatment so as to remove inorganic esters of sulfuric acid and other impurities so as to prevent formation of inorganic salts. Clays which are particularly suitable are highly adsorbent clays such as Attapulgus clay, Floridin, bentonite, bauxite, fuller's earth, etc. Still another modification in preparing pure oil-soluble sulfonates is to add to the sludge-free acid-treated oil a solvent such as benzol, carbon tetrachloride and the like and to neutralize said mixture with a caustic solution. The spent caustic solution is removed. The solvent is distilled off, leaving a substantially pure sulfonate in oil mixture. The product can be air blown and dehydrated to remove impurities. Instead of sulfonating a mineral oil a small amount of waxy material may be added to obtain a more improved sulfonate. The sulfonic acids may be formed by acidifying the neutralized sulfonate or a particular desired salt of a sulfonic acid may be obtained by double decomposition. Also petroleum sulfonates may be produced by the process disclosed in the following U. S. patents: 2,388,677; 2,395,713; 2,413,199; 2,413,311; 2,414,773; 2,416,397 and if desired, the petroleum sulfonates may be purified by means disclosed in U. S. Patents 2,236,933; 2,334,532; 2,357,866; 2,368,452; 2,406,763.

Instead of using petroleum hydrocarbons and alkylated aromatics, as referred to above, mixtures of said materials with other materials may be sulfonated such as olefins, olefin polymers, isoalkanes of high molecular weight, hydrocarbon rubber, cycloaliphatic hydrocarbons, natural fats, fatty oil waxes, their fractions and derivatives. Specifically the following fatty materials may be sulfonated or admixed with petroleum fractions and then sulfonated:

castor oil
cocoanut oil
corn oil
cottonseed oil
horse fat
wool fat
Japan wax
olefin waxes
paraffin waxes
wax tailings
lard oil
mutton tallow
beef tallow
neat's-foot oil
palm oil
peanut oil rapeseed oil
soya bean oil
sperm oil
whale oil
petrolatum
vegetable and animal phosphatidic material
montan wax
carnauba wax
beeswax
spermaceti
castor oil distillate
ozokerite
tall oil
and the like In addition to these oils and fats, their fatty acids, glycerides and the like can be used. Also free fatty acids of high molecular weight and having at least 12 carbon atoms, their esters and amides can be sulfonates and used as an additive of this invention particularly when in combination with an oil-soluble petroleum sulfonate.

The sulfonic acid compounds which are particularly preferred are the mahogany acids obtained from lubricating oils, various alicyclic or aliphatic sulfonic acids, such as fatty sulfonic acids, naphthalene sulfonic acids; sulfonic acids of various aromatic hydrocarbons such as alkylated benzenes, diphenyls, xylenes, diphenyl methanes, tetralines, naphthalenes, anthracenes, phenanthrenes, alkyl phenolic compounds; halo aromatic compounds, e. g. chlorinated diphenyl oxides; naphthylamine, diphenyl sulfides, diphenyl amines; alkylated pyridines, quinolines, isoquinolenes, pyrral, pyrolidines, piperidines, thiophenes, etc. Also organic compounds containing polysulfonic acid groups can be used and the above compounds may contain substituent groups such as halogen hydroxy, hydrosulfide, ether, amino, imino, sulfide, carboxyl ester, etc.

The following mixtures of alkaline earth metal salts of organic sulfonic acids are particularly preferred.

| Cation Mixture | Anion |
|---|---|
| Calcium and Barium<br>Barium and Strontium<br>Strontium and Magnesium<br>Calcium and Strontium<br>Barium and Magnesium<br>Calcium and Magnesium | benzene sulfonic acid<br>naphthalene sulfonic acid<br>tri-isopropyl sulfonic acid<br>polyamyl sulfonic acid<br>diwax benzene sulfonic acid<br>tri-isobutyl cresol sulfonic acid<br>oil-soluble petroleum sulfonic acid obtained from turbine oil, lubricating oil, petrolatum, and mixtures thereof |

The anion portion of the mixed salts may be the same or different. Thus, a mixture of calcium and barium petroleum sulfonate may be used or the mixture may consist of a calcium petroleum sulfonate and a barium diwax benzene sulfonate. The amount of mixed sulfonates which can be used may vary from between about 8% to 10% and preferably between about 5% to 7% by weight. The ratio of the two metals may vary over wide limits and depends upon the cations, the anions used, the amount of oxidized wax used and the type of surface and conditions under which the surface is to be protected. In the case of calcium and barium salt mixtures of petroleum sulfonic acid, it is preferable that the calcium salt be in excess of the barium salt.

The non-aromatic alcohols may be saturated and/or unsaturated aliphatic or cyclic alcohols having at least 3 carbon atoms in the molecules and preferably between 4 and 18 carbon atoms, such as propyl, isopropyl, butyl, isobutyl, amyl, isoamyl, hexyl, heptyl, octyl, nonyl, decyl, lauryl, tridecyl, tetradecyl, cetyl, oleyl, stearyl; allyl, linolenyl, linoleyl alcohols; diacetone alcohol; cyclic alcohols, e. g. cyclohexanol, cyclopentanol, cycloheptanol, 4-teriary amyl cyclohexanol, ditertiary amyl cyclohexanol, methyl cyclohexanol, amyl cyclohexanol, dimethyl-cyclohexanol, naphthenic alcohol, amyl cyclo-butanol, etc.

The amount of alcohol used is very small and generally ranges from about 1% to 5%. The function of the alcohol appears to be to aid in displacing any aqueous solutions or water from a surface, help solubilize the sulfonates and facilitate the spreading of the composition on the surface in a uniform manner which adheres tenaciously to the surface being treated.

The balance of the composition generally exceeding about 60% of the invention comprises a light hydrocarbon having a boiling point range below that of mineral lubricating oil such as kerosene, mineral seal oil, gas oil, various petroleum naphtha cuts, mineral spirits, kerosene $SO_2$ extracts, aromatic solvents, petroleum ethers, liquid paraffinic hydrocarbons, e. g. octane, isooctane, dodecane; cycloparaffins, e. g. cyclohexane methyl cyclohexanol, etc.

A general formula of a composition of this invention may contain the following components:

| | Per cent by weight |
|---|---|
| Oxidized waxy hydrocarbon | 5–25 |
| Mixed alkaline earth metal salts of organic sulfonic acids | 2–10 |
| Non-aromatic alcohol | 1– 5 |
| Light hydrocarbon boiling below the lubricating oil range | balance |

Compositions of this invention may be applied by any suitable means such as spraying, brushing, swabbing, dipping and the like.

Compositions of this invention can be made by simply heating and mixing an oxidized waxy material with a small amount of light hydrocarbon at a temperature of around about 350° F., until homogeneous mixture has been obtained. This mixture is cooled and the mixed sulfonates, alcohol and the balance of the light hydrocarbon is slowly added with continuous agitation until a desired homogeneous product is formed.

A specific example of a composition of this invention (henceforth designated as Composition A) comprises:

| | Per cent by weight |
|---|---|
| Oxidized short residue petroleum wax | 10–20 |
| Ca and Ba petroleum sulfonate (the Ba salt comprises about 5% of the total amount of sulfonate used) | 5– 7 |
| Isobutyl alcohol | 1– 5 |
| Mineral spirits | balance |

The following table further illustrates suitable coating compositions for preventing rusting. The compositions may be prepared in the manner described above.

| Components:[1] | | | | | | | |
|---|---|---|---|---|---|---|---|
| Oxidized microcrystalline wax | x | | | | | x | |
| Oxidized paraffin wax | | | | | x | | |
| Oxidized petroleum | | | | | | | x |
| Oxidized slop wax | | x | x | | | | |
| Oxidized short residue petroleum wax admixed with a minor amount of non-oxidized wax | | | | x | | | |
| Ca and Ba petroleum sulfonates | x | | x | x | | | |
| Ca and Ba diwax benzene sulfonates | | x | | | | | |
| Ca and Ba benzene disulfonates | | | | | | | |
| Ca and Ba tri-isopropyl naphthalene sulfonates | | | | | | | |
| Ca and Mg petroleum sulfonates | | | | | x | | |
| Ca and Sr petroleum sulfonates | | | | | | x | |
| Ca and Mg diwax benzene sulfonates | | | | | | | |
| Ba Sr petroleum sulfonates | | | | | | | x |
| Isobutyl alcohol | x | x | | | x | x | x |
| Amyl alcohol | | | | | | | |
| Octyl alcohol | | | | | | | |
| Isoamyl alcohol | | x | | | | | |
| Allyl alcohol | | | x | | | | |

[1] All of the above compositions are diluted with a light liquid hydrocarbon such as mineral spirits, kerosene, etc., to obtain the desired consistency of the final product.

In order to determine the protective properties compositions of this invention possess, various metals were coated with compositions of this invention and subjected to the following tests:

Humidity cabinet test

In this test sand-blasted or polished steel panels which have been coated with a product of this invention were exposed continuously in an atmosphere of 100% relative humidity at a constant temperature (100 or 120° F.). A slow flow of saturated air through the cabinet is maintained and moisture condenses on the panels. The average time exposure until rusting occurs on the faces of the panels is taken as the life of the coating.

Salt spray test

In this test polished steel panels which have been coated with a composition of this invention are exposed continuously at a constant temperature (95° or 100° F.) to a salt mist or fog which is produced by the atomization of a 20% sodium chloride solution. The average time until rusting occurs on the faces of the panels is taken as the life of the coating.

Ultraviolet weathering unit test

In this test polished or sandblasted steel panels coated with a desired product to be evaluated are continuously exposed to intense light from a carbon arc and are intermittently wetted by a fine water spray. The average time until rusting occurs on the faces of the panels is taken as the life of the coating.

Steel panels coated with Composition A as noted in column 8 and compared with a commercial product X for rust inhibiting properties as determined by the above described tests.

The results are tabulated below:

| Test | Composition A | Composition X |
|---|---|---|
| Salt Spray Test 20%, 10 days | no rust | rust. |
| Ultraviolet Test, 25 days | do | Do. |

Compositions of this invention may be modified by addition thereto of salicylates, oleates, stearates, sulfated oils, e. g. paramine oleate, cyclohexylamine oleate or ricinoleate; salts of inorganic acids, e. g. metal phosphates, organic esters, e. g. dilorol phosphate, dilauryl phosphite, polycarboxylic acids, e. g. alkyl succinic acid, inorganic compounds, e. g. sodium and lithium nitrite, sodium chromate, fatty oils, e. g. lard oil, palm oil, tallow, wool grease, lanolin and fractions thereof.

Compositions of this invention may if desired be very easily removed by flushing, wiping, or by any other suitable means.

Many modifications and variations of this invention as hereinbefore set forth may be made without departing from the spirit and scope thereof and therefore only such limitation should be imposed as indicated in the appended claims.

We claim as our invention:

1. A rust inhibiting composition of matter containing the following constituents in the following proportions:

| | Per cent by weight |
|---|---|
| Oxidized short residue petroleum wax | 10–20 |
| Ca and Ba petroleum sulfonate | 5–7 |
| Isobutyl alcohol | 1–5 |
| Mineral spirits | balance |

2. A composition of matter adapted for use as a rust inhibitor comprising a major amount of a light liquid hydrocarbon, from about 5% to about 25% of an oxidized waxy hydrocarbon, between about 2 to 10% of a mixture of alkaline earth metal salts of organic sulfonic acid and about 1% to about 5% of a non-aromatic alcohol.

3. A composition of matter adapted for use as a rust inhibitor comprising a major amount of a light petroleum hydrocarbon boiling below the lubricating oil range, from about 5% to about 25% of an oxidized paraffin wax, from about 2% to 10% of a mixture of Ca and Ba petroleum sulfonates and about 1% to about 5% of isobutyl alcohol.

4. A composition of matter adapted for use as a rust inhibitor comprising a major amount of a light petroleum hydrocarbon boiling below the lubricating oil range, from about 5% to about 25% of an oxidized slop wax, from about 2% to 10% of a mixture of Ca and Ba petroleum sulfonates and about 1% to about 5% of isobutyl alcohol.

5. A composition of matter adapted for use as a rust inhibitor comprising a major amount of a light petroleum hydrocarbon boiling below the lubricating oil range, from about 5% to about 25% of an oxidized paraffin wax, from about 2% to 10% of a mixture of Ca and Sr petroleum sulfonates and about 1% to about 5% of isobutyl alcohol.

6. A composition of matter adapted for use as a rust inhibitor comprising a major amount of a light petroleum hydrocarbon boiling below the lubricating oil range, from about 5% to about 25% of an oxidized slop wax, from about 2% to 10% of a mixture of Ca and Sr petroleum sulfonates and about 1% to about 5% of isobutyl alcohol.

7. A composition of matter adapted for use as a rust inhibitor comprising a major amount of a light petroleum hydrocarbon boiling below the lubricating oil range, from about 5% to about 25% of an oxidized paraffin wax, from about 2% to 10% of a mixture of Ca and Ba diwax benzene sulfonate and about 1% to about 5% of non-aromatic alcohol.

8. A composition of matter adapted for use as a rust inhibitor comprising a major amount of a light petroleum hydrocarbon boiling below the lubricating oil range, from about 5% to about 25% of an oxidized paraffin wax, from about 2% to about 10% of a mixture of Ca and Sr diwax benzene sulfonate and about 1% to about 5% of a non-aromatic alcohol.

9. A composition of matter adapted for use as a rust inhibitor comprising a major amount of a light petroleum hydrocarbon boiling below the lubricating oil range, from about 5% to about 25% of an oxidized slop wax, from about 2% to 10% of a mixture of Ca and Ba diwax benzene sulfonate and about 1% to about 5% of a non-aromatic alcohol.

10. A composition of matter adapted for use as a rust inhibitor comprising a major amount of a light petroleum hydrocarbon boiling below the lubricating oil range, from about 5% to about 25% of an oxidized slop wax, from about 2% to 10% of a mixture of Ca and Sr diwax benzene sulfonate and about 1% to about 5% of a non-aromatic alcohol.

KNAPEL F. SCHIERMEIER.
HERBERT A. POITZ.

REFERENCES CITED

The following references are of record in the file of this patent:

UNITED STATES PATENTS

| Number | Name | Date |
|---|---|---|
| 2,184,952 | Zimmer et al. | Dec. 26, 1939 |
| 2,348,715 | Adams et al. | May 16, 1944 |
| 2,359,738 | Schiermeier | Oct. 10, 1944 |
| 2,383,033 | Adams et al. | Aug. 21, 1945 |
| 2,408,971 | Duncan | Oct. 8, 1946 |
| 2,421,004 | Berger et al. | May 27, 1947 |